US005640295A

United States Patent [19]
Harris et al.

[11] Patent Number: 5,640,295
[45] Date of Patent: Jun. 17, 1997

[54] ALIGNMENT FEATURES FOR LOAD CENTER INTERIOR ASSEMBLY

[75] Inventors: Michael Ray Harris, Winchester; Norman Michael Newsome; Randall Lee Blue, both of Lexington, all of Ky.

[73] Assignee: Square D Company, Palatine, Ill.

[21] Appl. No.: 529,861

[22] Filed: Sep. 18, 1995

[51] Int. Cl.$^6$ .................................................. H02B 1/04
[52] U.S. Cl. ............................ 361/644; 361/825; 439/717
[58] Field of Search ........................... 439/715, 717; 174/70 B, 71 B, 72 B; 361/825, 627, 634, 637, 639, 640, 641, 644, 647, 648, 652, 657; 200/296, 307; 248/674, 917; 312/7.2, 223.1

[56] References Cited

U.S. PATENT DOCUMENTS

| | | | |
|---|---|---|---|
| 4,041,358 | 8/1977 | Donahue | 361/660 |
| 4,142,225 | 2/1979 | Diersing | 361/647 |
| 4,360,857 | 11/1982 | Olashaw | 361/361 |
| 5,272,591 | 12/1993 | Blue | 361/622 |
| 5,351,165 | 9/1994 | Hancock | 631/637 |
| 5,519,175 | 5/1996 | Cole | 361/627 |

Primary Examiner—Gerald P. Tolin
Attorney, Agent, or Firm—Larry I. Golden; Kareem M. Irfan

[57] ABSTRACT

The present invention provides an interior panel assembly for a load center having a plurality of adjacent components for distributing electrical service to branch circuits. The panel assembly includes at least one bus bar formed with branch stabs for electrically connecting to terminals extending from a plurality of circuit interrupters and a generally planar support base having a front face for securing each bus bar. One end of each bus bar is adapted for electrical and mechanical connection to one of the adjacent components. The panel assembly aligns the interior panel assembly relative to an adjacent component and relative to an enclosure for the load center so that the adjacent component connects electrical service to each bus bar and the interior panel assembly secures within the enclosure. Preferably, at least one pair of flanges is integrally formed along the circumference of the support base. The pair of flanges are positioned along opposing ends of the support base. In another preferred embodiment a bracket having an elongated body with a generally flat profile is fastened to one of the enclosure walls. The bracket also includes at least one tab integrally formed with the body. The tab has side walls and a distal end extending perpendicularly outward from the body. The tab has an embossed profile with the tab being raised out of the plane of the elongated body.

5 Claims, 8 Drawing Sheets

5,640,295

ALIGNMENT FEATURES FOR LOAD CENTER INTERIOR ASSEMBLY

RELATED APPLICATIONS

The subject matter of this application is related to the subject matter of the following application:

U.S. application Ser. No. 08/529,705, now U.S. Pat. No. 5,600,536, entitled "Connector Bar For Load Center Interior Assembly" filed on even date herewith by Norman Michael Newsome, Jeffrey Owen Sharp, Michael Ray Harris, and Robert Bradley Lamar, Jr.;

the above application having the same assignee as the present invention, and incorporated herein by reference in their entirety.

FIELD OF THE INVENTION

The present invention relates to an interior panel assembly of a load center, electrical distribution device, and the like, and more particularly to the components of the interior assembly which have alignment features to provide for proper positioning relative to each other component and within a load center enclosure.

BACKGROUND OF THE INVENTION

Load centers and other electrical distribution devices are commonly used in residential, commercial, and industrial applications. Individual circuit interrupters are mounted within these devices to protect branch circuits against overload and fault conditions. Basically, circuit interrupters like circuit breakers and fusible switches comprise a pair of separable contacts, a spring-operated mechanism for effecting separation of the contacts, and a tripping mechanism or fuse which automatically releases the operating mechanism upon occurrence of an overload or fault condition.

Load centers provide an enclosure for an interior assembly including several components for receiving electrical service and distributing the service to branch circuits. The interior assembly usually includes a panel constructed with bus bars or projecting lugs to form disconnect contacts for the removable individual circuit breakers. These bus bars and lugs are rigidly attached to the upper surface of the panel support molding. The panel incorporates an insulating base to carry an incoming line terminal for each phase to a main breaker. The main breaker is aligned with a neutral base and lug barrier base to provide for electrical connections between terminals or lugs located on the bases. The circuit for each phase is completed through the individual circuit breaker and terminals on the neutral base.

The main breaker usually incorporates line and load terminals designed to accept copper or aluminum stranded wire. In most installations the electrical service enters the load center enclosure from either the top and bottom wall. When the service feeds the interior assembly through the top wall of the enclosure, the "ON" terminals of the main breaker are connected to the field installed stranded wiring and the "OFF" terminals are connected to the bus bars of the panel. When the service feeds the interior assembly through the bottom wall of the enclosure, the "OFF" terminals of the main breaker are connected to the field installed stranded wiring and the "ON" terminals are connected to the bus bars of the panel. The connection to the bus bars of the panel is usually made with a solid copper or aluminum connector bar. The breaker is modified to include a stud or bolt to fasten the connector bar to the breaker. Most terminals on main breakers are designed for connecting to stranded wire and not a solid connector. A problem can arise in providing proper electrical contact between the terminal and a solid connector during both normal and shorting conditions of the main breaker. Connection to the solid connector should be made without deforming or otherwise damaging the terminal. To provide the flexibility of either a top or bottom installation of service, there is a need for a solid connector which can connect to the terminals of the main breaker without diminishing electrical contact or deforming the terminal.

Each of the components of the interior assembly must be in proper position relative to one another to complete the electrical connections. The interior assembly must also be mounted in the proper position within the load center enclosure itself. Problems arise in providing the required alignment between the components of the interior assembly and within the load center enclosure. The need arises to align and mount an interior assembly in a load center enclosure which often provides limited space with little room for maneuvering.

Other problems caused by aligning and assembling the load center interior is the quantity of parts that must be tracked, inventoried, and supplied in the field to properly complete the assembly. A reduced part count, avoiding the use of complicated tools, and less manual labor during assembly would decrease installation time and cost.

Mounting the interior assembly within the load center has commonly used a plurality of fasteners like screws and bolts protruding through the rear wall of the enclosure. A variety of different hole patterns are normally provided in a single enclosure to provide flexibility in mounting more than one type of interior assembly. Accordingly, not all of the holes may be used to mount a particular interior assembly. In certain applications it is undesirable to have holes in the enclosure. Moisture, rain, or other hazardous materials may leak into the enclosure and create a dangerous condition. The need arises in certain applications for an interior assembly which can be mounted within a load center enclosure without creating holes in the walls of the enclosure.

SUMMARY OF THE INVENTION

Accordingly, the present invention provides an interior panel assembly for a load center having a plurality of adjacent components for distributing electrical service to branch circuits. The panel assembly includes at least one bus bar formed with branch stabs for electrically connecting to terminals extending from a plurality of circuit interrupters and a generally planar support base having a front face for securing each bus bar. One end of each bus bar is adapted for electrical and mechanical connection to one of the adjacent components. The panel assembly also includes means for aligning the interior panel assembly relative to an adjacent component and relative to an enclosure for the load center so that the the adjacent component connects electrical service to each bus bar and the panel assembly mounts within the enclosure. The aligning means is integrally formed with the support base.

Preferably, the aligning means includes an indentation formed in the circumference of the support base. The indentation defined by an end wall and side walls. The spacing between the side walls pre-determined to nest the adjacent component therebetween so that lateral movement is restrained and the panel assembly is aligned within the desired position for mounting to the enclosure and for electrically connecting to another components of the interior assembly. The aligning means also includes at least one pair of flanges integrally formed along the circumference of the support base. The pair of flanges is positioned along opposing sides of the support base.

The present invention also provides a load center for distributing electrical service to branch circuits. The load center includes an enclosure having a back wall, side walls and a removable cover defining an interior. An interior panel assembly is included which has at least one bus bar formed with branch stabs for electrically connecting to terminals extending from a plurality of circuit interrupters. The panel assembly has a generally planar support base with a front face for securing each bus bar. One end of each bus bar is adapted for electrical and mechanical connection to the electrical service. The panel assembly has means for aligning the panel assembly relative to the electrical service and relative to the enclosure for the load center so that the electrical service to the bus bars and the panel assembly secures to the back wall of the enclosure. The aligning means is integrally formed with the support base and the back wall of the enclosure.

The present invention also includes a bracket for aligning and mounting an panel assembly within the enclosure walls of a load center for distributing electrical service to branch circuits. The bracket includes an elongated body having a generally flat profile. The body is adapted to be fastened to one of the enclosure walls. The bracket also includes at least one tab integrally formed with the body. The tab has side walls and a distal end extending perpendicularly outward from the body. The tab has an embossed profile with the tab being raised out of the plane of the elongated body. Preferably, the side walls of the embossed tab forms a leading edge by gradually narrowing the width of the tab towards the distal end so that the leading edge assists the positioning of a flange sliding underneath the distal end by engaging the flange before the distal end to begin flexing the flange upward.

An object of the present invention is to provide a load center interior assembly which reduces the part count and the labor content needed for aligning the components of the assembly and mounting the assembly within the load center enclosure compared to the prior art.

Another object of the present invention is to provide a solid connector for connecting the bus bars of a panel to the terminals of a main breaker without dimishing electrical contact or deforming the terminals.

Still another object of the present invention is to provide a load center enclosure for mounting an interior assembly without holes remaining in the walls of the enclosure.

Other and further advantages, embodiments, variations and the like will be apparent to those skilled-in-the-art from the present specification taken with the accompanying drawings and appended claims.

BRIEF DESCRIPTION OF THE DRAWINGS

In the drawings, which comprise a portion of this disclosure.

DESCRIPTION OF THE PREFERRED EMBODIMENT

Figure 1:
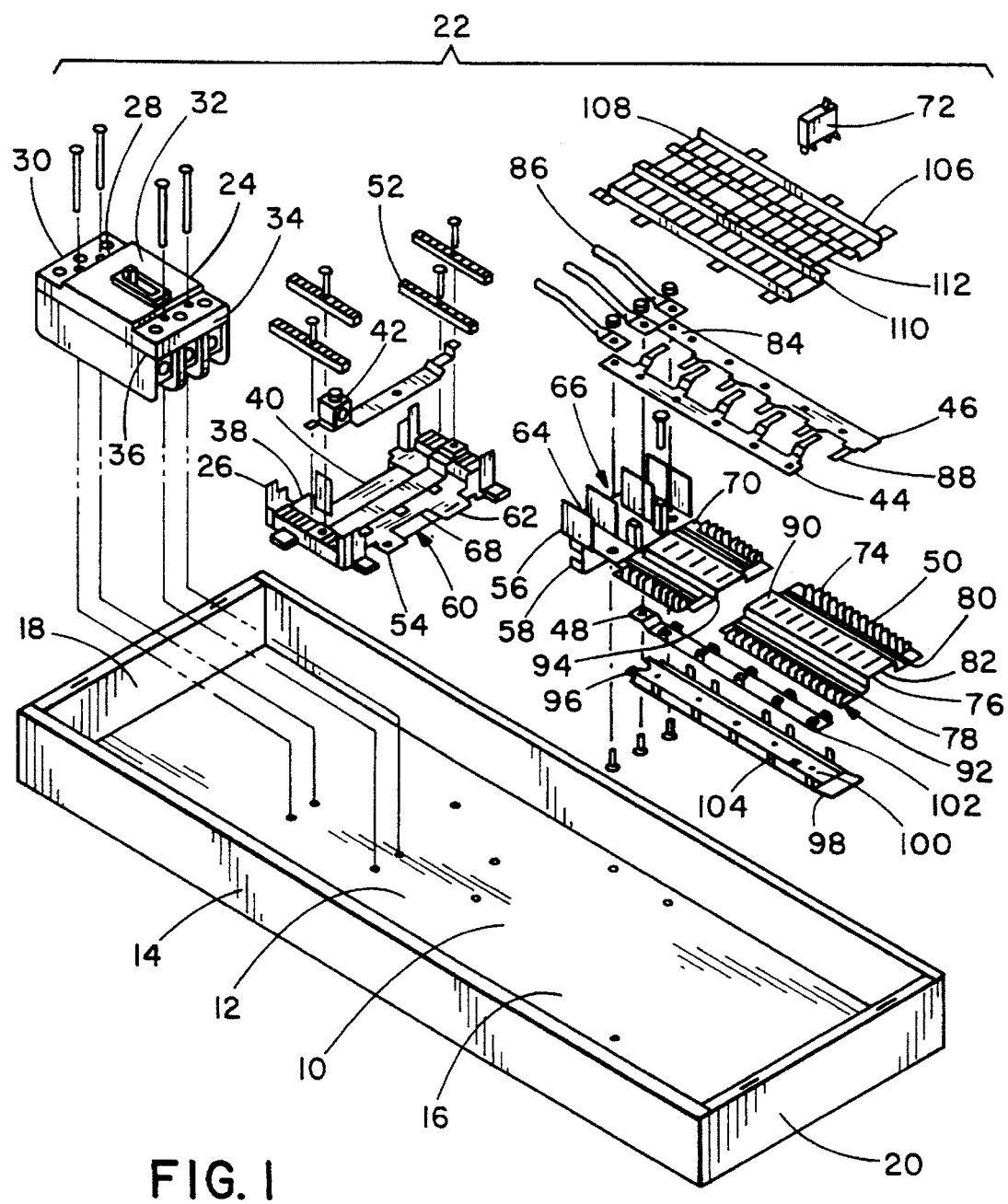
FIG. 1 is an exploded, perspective view of a load center enclosure and interior assembly having the alignment features of the present invention.

Referring now to FIG. 1, a load center for a multi-phase circuit is generally indicated by the reference numeral 10. The load center 10 includes an enclosure 12 defined by sidewalls 14, a backwall 16, a top wall 18, and a bottom wall 20. The load center 10 is enclosed by cover panel (not shown) which connects to the top of the sidewalls 14.

In a multi-phase circuit, there is an electrical power line to service each respective phase entering the enclosure 12 usually through the top wall 18 and/or bottom wall 20. The load center 10 described and illustrated herein is for a three- or single-phase circuit. In accordance with the teachings available in the electrical art, it would be within the skill of one to change the number of phases and modify the invention accordingly.

As illustrated by the load center embodiment in FIG. 1, the present invention provides an interior assembly, generally designated as 22, which provides an alignment feature or nesting arrangement between its various components such as a main breaker 24 and a neutral base 26 to align the components relative to one another. The proper alignment between the individual components of the interior assembly 22 provided by the nesting arrangement allows easy assembly of the electrical connections therebetween.

The electrical power lines entering through the top wall 18 of the enclosure connect to the "ON" terminals 28 of the main breaker 24 which are accessible on the exterior surface of one end 30 of a housing 32. The exterior surface of the opposite end 34 of the housing incorporates the "OFF" terminals 36 and is shaped to provide a nesting arrangement with one end of the the adjacent component of the interior assembly 22, namely the neutral base 26. The end 38 of the neutral base has a surface 40 with a complimentary shape to abut the corresponding surface of end 34 of the main breaker housing.

The neutral base 26 includes lug terminal 42 for electrical connection to the neutral phase. Terminal strips 52 provide electrical connection to the branch circuits. The opposite end 54 of the neutral base includes a nesting arrangement for engaging the end 56 of the adjacent component of the interior assembly, namely a lug barrier base 58. The opposite end 54 of the neutral base includes an indentation 60 defined between side walls 62 which is adapted to receive a tab 64 integrally formed on the lug barrier base. The tab 64 of the lug barrier base has a complementary shape to the indentation 60 of the neutral base with the edges 66 of the tab abutting the side walls 62 and back edge 68 of the indentation when inserted therein. Once inserted, the tab 64 and indentation 60 provide proper alignment between the neutral base 26 and the lug barrier base 58.

The end 70 of the lug barrier base opposite the neutral base connects to the end of the adjacent component of the interior assembly, namely the panel assembly 50. The panel assembly 50 provides an electrical distribution device for mounting a plurality of circuit breakers such as 72 to control electrical distribution to branch circuits. A support base 74 aligns and positions the bus bars 44, 46, and 48 electrical and mechanical connection with other components of the panel assembly 50. The support base 74 includes a plurality of upstanding, elongated, parallel dividers 76 integrally formed therewith. The dividers 76 separate the adjacent circuit breakers 72 and reduce the probability of accidental bridging of a conductive member between either circuit breaker terminals or bus bars of different electric potential.

Integrally formed with the support base 74 are channels 78, 80, and 82 which provide a nesting alignment for respective bus bars 44, 46, and 48. The three-phase load center 10 illustrated in FIG. 1 specifically depicts the bus bars 44, 46, and 48 as the A-, B-, and C-phases respectively.

The end 84 of each bus bar of the panel assembly 50 provides for electrical connection to the "OFF" terminal 36 on the main breaker 24 for their repective circuit. A connector bar 86 completes the electrical connection between the "OFF" terminal 36 and the end 84 of each bus bar of the panel assembly 50. Any conventional means for making the electrical connection to the end 84 of each bus bar of the panel assembly 50 such as screws, rivets, clips or by welding is suitable. The design of the connector bar 86 will be described in more detail hereafter.

Integrally formed with the bus bars 44, 46, and 48 are a plurality of branch stabs 88, respectively. Each of the circuit breakers 72 is attached to one of the branch stabs 88. Preferably, each of the circuit breakers 72 uses a pair of spring-biased contact jaws to make an electrical connection with the stabs 88. The contact jaws flex around each side of the branch stab 88 with a spring-like bias in a straddle position. Other mechanical fasteners like screws are also suitable for making the electrical connection between each circuit breaker 72 and the stab 88.

The support base 74 provides a pre-determined series of cut-outs 90 in the back face 92 between the dividers 76. The sequence of the series of cut-outs 90 allows the B-phase stabs 88 to extend through the back face 92 of the support base to align between the dividers 76.

On the back face 92 of the support base is a second channel 94 which extends parallel to the bus bar channel 82, but having a greater width. The second channel 94 corresponds in size to a back face shield 96. The side edges 98 of the back face shield mount flush with the back face 92 of the support base. The back face shield 96 includes projections 100 which are provided to assist in the alignment of the bus bar 48 by mating with holes 102.

The back face shield 96 attaches to the support base by means of the integrally formed prongs 104. The distal end of each prong 104 mates with a corresponding hole 106 in the back face 92 of the support base.

The panel assembly 50 includes a cover 108 having a generally flat planar body which is of sufficient size to substantially cover the bus bars 44, 46, and 48. The bottom face of the cover 108 abuts the top surface of the bus bars 44 and 46 and the stabs 88. The top face of the cover 108 is configured to allow electrical and mechanical connection between the circuit breaker 72, the support base 74 and the stabs 88. The top face of the cover 108 does not interfere with the mounting of the individual circuit breakers 72 between the dividers 76. The profile of the cover 108 has a slight offset 110 to conform to the raised branch stabs 88. A first plurality of apertures 112 is provided through the cover in the central area of the offset 110. The apertures 112 are spaced to correspond to the position of the stabs 88 beneath the cover 108. Each of the apertures 112 is of sufficient size to allow a contact jaw of the circuit breaker 72 to pass through the cover 108 and engage a pair of contact jaws electrically and mechanically connect with the respective stab 88 beneath the cover.

One of the advantages of the present invention is the alignment features between two or more components of the interior assembly 22. An example of the inventive alignment is illustrated with more specificity in FIG. 2. The exterior surface of the end wall 114 and the side walls 116 of the main breaker 24 abut the corresponding surface of the end wall 118 and side walls 120 defining an indentation 122 in the end 38 of the neutral base. Nesting the opposite end 34 of the main breaker in the indentation 122 of the neutral base aligns both the lateral position and longitudinal distance between these two components of the interior assembly 22. The resulting proper alignment allows the electrical connection between the "OFF" terminals 36 of the main breaker to the ends 84 of the bus bars 44, 46, and 48 with the connector bars 86, shown in phantom in FIG. 2. The nesting arrangement also provides alignment of the breaker 24 for mounting to the back wall 16 of the enclosure with screws or other fasteners in the factory and in the field when reversing the breaker 24 for feeding the electrical service from through the bottom wall 20 of the enclosure.

Figure 2:
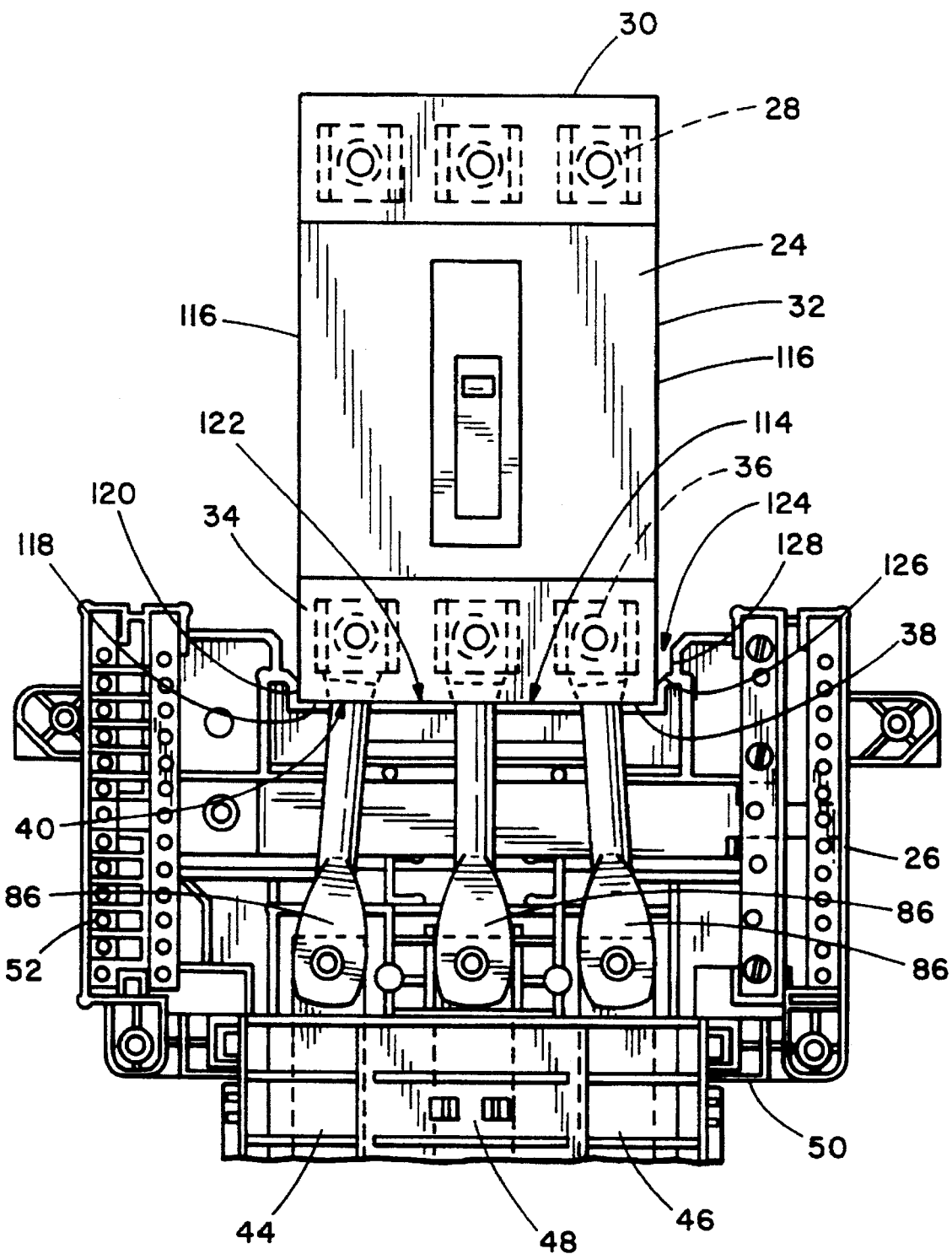
FIG. 2 is an isolated, plan view of a main breaker, neutral base and panel assembly demonstrating the alignment features of the present invention.

The flexibility of the present invention to provide more than one nesting arrangement with the same interior assembly component is demonstrated by the neutral base 26 illustrated in FIG. 2. A cascade formation of multiple indentations in the neutral base 26 accommodates main breakers 24 having different housing sizes. In addition to the indentation 122 described above, a second indentation 124 in the end 38 of the neutral base is defined by a second set of end walls 126 and side walls 128. The surface of the end walls 126 and side walls 128 would abut the exterior surface of a second main breaker (not shown) in a manner similar to that previously described. The result is that the second main breaker would be restrained in the proper lateral position with the desired longitudinal distance between the electrical connections of the second main breaker and the bus bars of the panel assembly. One example of using the above described cascade formation is to size the first indentation 122 of the neutral base to nest the three phase "K" style breakers and to size the second indentation 124 for the larger three phase Q2-style breakers, both styles of breakers manufactured by the Square D Company.

Figure 3:
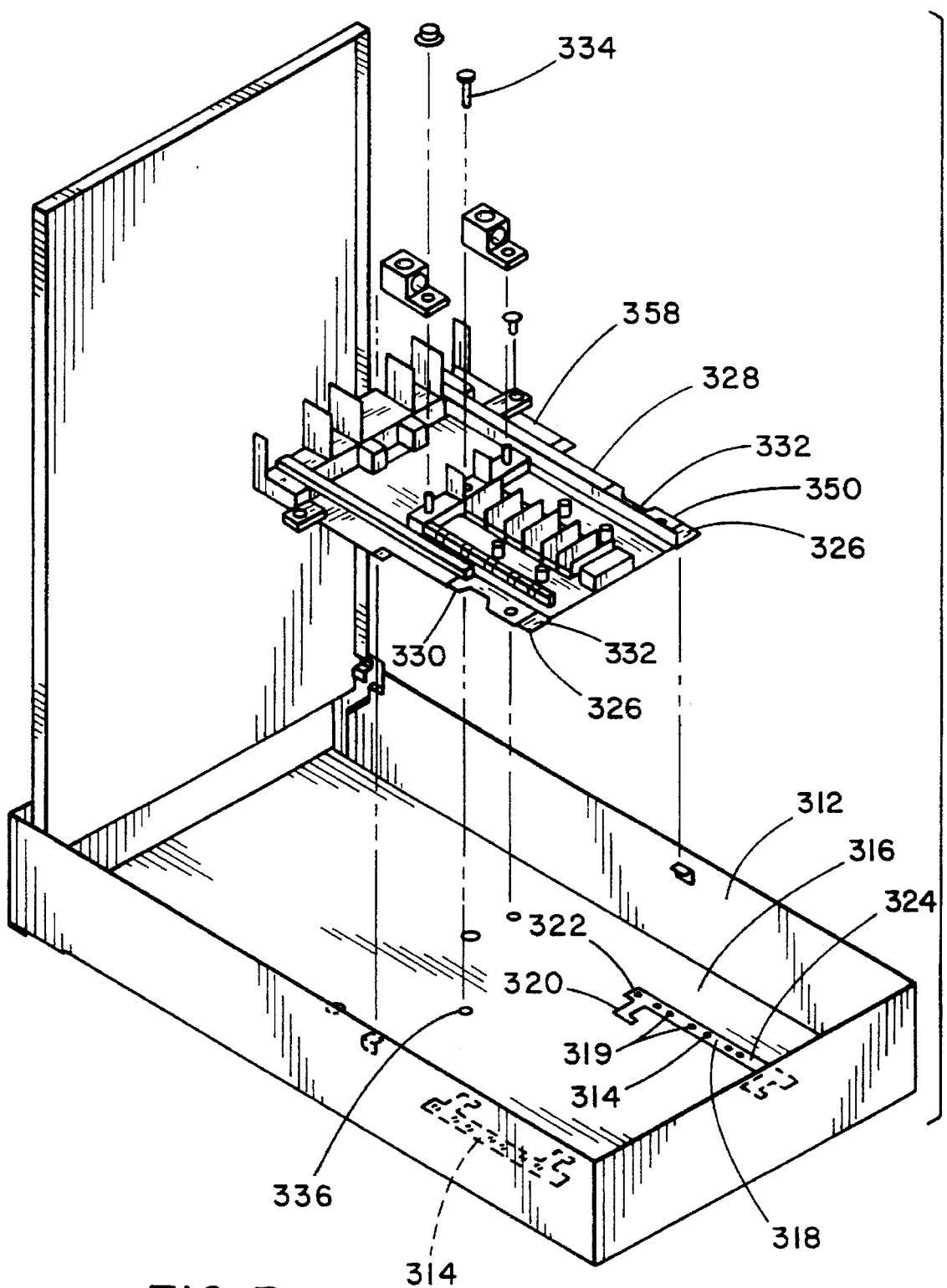
FIG. 3 is an exploded, perspective view of a panel assembly and neutral base aligning with brackets within a load center enclosure.

Another advantageous alignment feature of the present invention is illustrated in FIG. 3 for properly aligning the interior assembly within a load center enclosure 312. Another embodiment of the enclosure 312 includes a pair of brackets 314 (shown in phantom) fastened to the back wall 316. Each of the brackets 314 has an elongated body 318 with an embossed tab 320 integrally formed at each of the ends 322 and 324 of the body of the bracket. The embossed tabs 320 extend perpendicularly from the elongated body 318 towards the interior of the enclosure 312. The brackets 314 are positioned on the back wall 316 to arrange the respective pairs of embossed tabs 320 generally opposite one another.

Although any conventional means of attaching two sheet metal pieces together is suitable, it is preferred to fasten the brackets 314 to the back wall 316 by spot welds. This is particularly desirable when the load center 312 is exposed to potential leakage of moisture, rain or other environmental hazards into the enclosure. Spot welding eliminates holes in the back wall 316. The body 318 of each bracket can include dimples 319 on the back face of the body to engage corresponding nubs protruding upwardly from the back wall 316 of the enclosure to align the bracket 314 in the desired for fastening. For those applications where a molded plastic load center is used, the brackets 314 can be integrally formed in the back wall during the molding process.

FIG. 3 specifically illustrates a panel assembly 350 and lug barrier base 358 for aligning within the enclosure 312. The panel assembly 350 includes flanges 326 along opposing sides 328 and 330. The panel assembly 350 is lowered into the enclosure 312 adjacent to the back wall 316. The flanges 326 of the panel assembly are then slid underneath the embossed tabs 320 of the brackets. The thickness of the flanges 326 is preferably greater than the height of the embossed tabs 320 raised above the back wall 316. The embossed tabs 320 deflect slightly to engage the flanges 326 and exert a positive pressure against the flanges 326 and the back wall 316 of the enclosure. The brackets 314 align the panel assembly in proper lateral and longitudinal position. Preferably, the flanges 326 include dimples 332 on their upper surface at the point along the flanges where the embossed tabs 320 align and stop the panel assembly 350 in desired proper position. The dimples 332 increase the force necessary to move the panel assembly 350 out of the final aligned position. Any longitudinal movement of the panel assembly 350 is further restrained by inserting a screw 334 through the panel assembly 350. The threads of the screw 334 engage a hole 336 in the back wall 316 of the enclosure. The threads of the screw 334 seal the hole 336.

Figure 4:
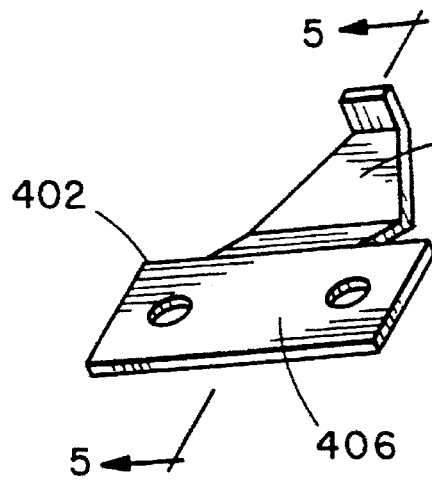
FIG. 4 is another embodiment of the brackets for aligning an interior assembly within a load center.
Figure 5:
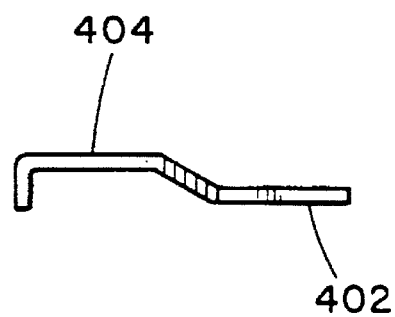
FIG. 5 is a cross-section view along the lines 5—5 of the alternate embodiment of the bracket illustrated in FIG. 4.
Figure 6:
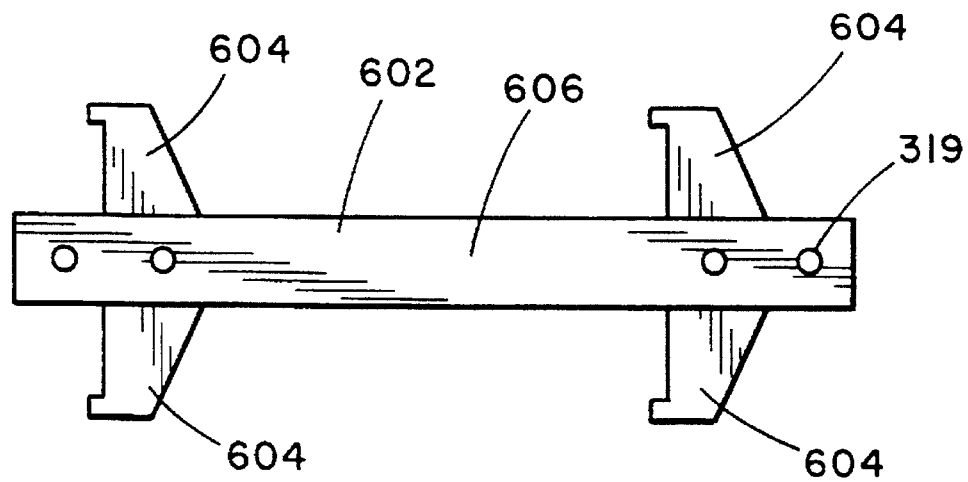
FIG. 6 is the plan view of another embodiment of the brackets for aligning an interior assembly within a load center.

FIG. 3 illustrates one embodiment of the aligning brackets 314 to which the present invention is not limited. For example, each of the brackets 314 can include more than two embossed tabs 320. Another embodiment is illustrated in FIGS. 4 and 5 which illustrate a bracket 402 having only one embossed tab 404 and the raised position of the tab 404 relative to the elongated body 406 of the bracket. FIG. 6 illustrates a bracket 602 which is not limited to either a right- or left-handed configuration. The elongated body 606 includes embossed tabs 604 which extend generally perpendicularly from both sides of the body 606. A component of the interior assembly 22 can engage the embossed tabs 604 on either side of the bracket.

Figure 7:
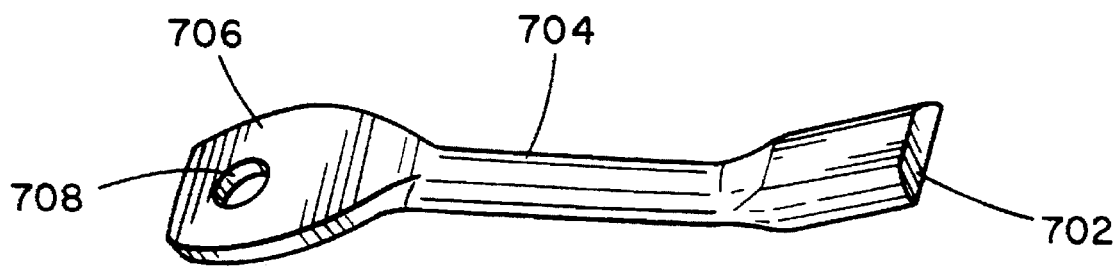
FIG. 7 is an isolated, perspective view of a connector bar of the present invention.

As previously described with reference to FIGS. 1 and 2, the connector bars 86 provide electrical connection between the main breaker 24 and the bus bars 44, 46, and 48 of the panel assembly. The preferred connector bar 86 of the present invention is illustrated in FIG. 7. One end 702 of the elongated body 704 is configured to insert into a lug body of the terminals on the main breaker 24. The cross-sectional configuration of the end 702 will be discussed in more detail below. The opposite end 706 of the body is configured to connect to the bus bars 44, 46, and 48 of the panel assembly. The opposite end 706 includes a hole 708 for receiving a stud integrally formed with on the end of each bus bar. A fastener can be applied to the stud to tighten the connection between each bus bar and the opposite end 706 of the connector bar. The electrical connection at the opposite end 706 is not limited to the example present in FIG. 7. Other mechanical connections are suitable.

Figure 8:
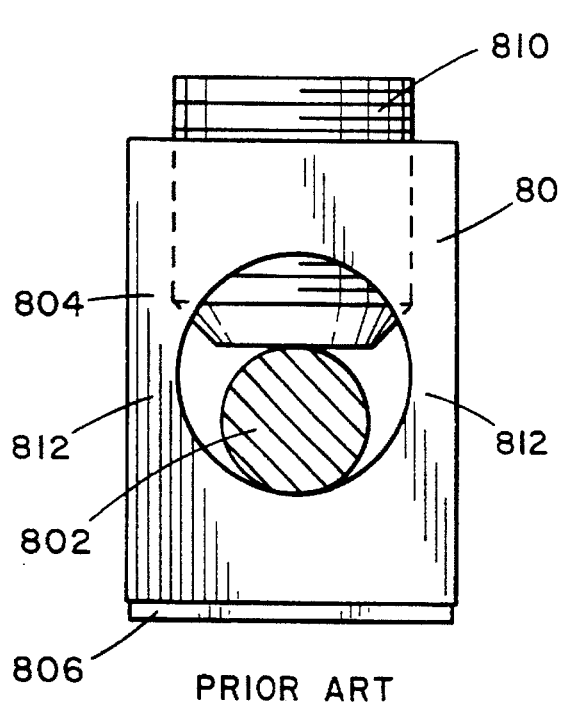
FIG. 8 is a side view of a lug terminal and bus bar of a prior art main breaker with the cross section of a prior art solid connector.

As illustrated in FIG. 8, a problem can arise in making an electrical connection between a solid connector 802 and a lug terminal 804 of a main breaker in the prior art. Each phase of the prior art main breaker includes a bus bar 806 which connects from the internal switch mechanism (not shown) to the lug body 808 of the terminal 804 accessible external to the prior art main breaker. A binding screw 810 can draw the sides 812 of the lug body 808 upward as the binding screw 810 is tightened down on the solid connector 802. The tightening action distorts the lug body 808 and interferes with the electrical connection between the lug body 808 and the bus bar 806 of the prior art main breaker. The result is possible arcing, a greater voltage drop, and increased heat build-up in the electrical connection between the bottom of the lug body 808 of the terminal and the bus bar 806 within the prior art main breaker.

Figure 9:
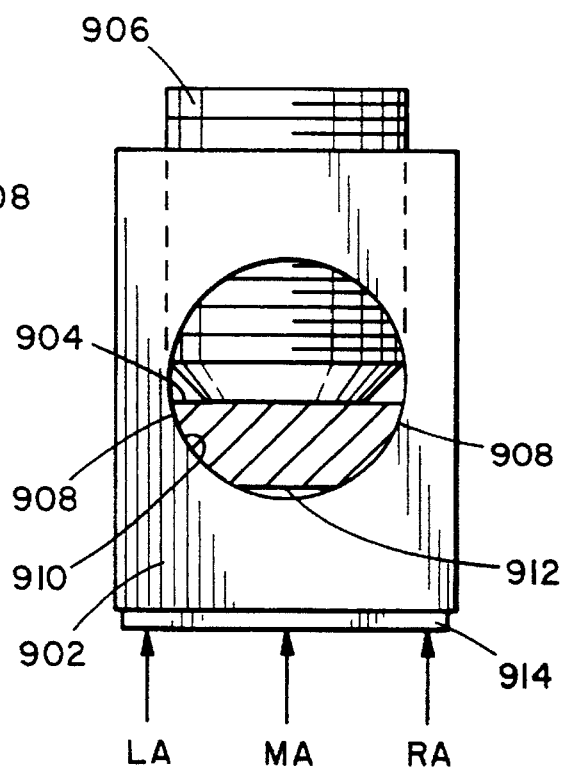
FIG. 9 is a side view of a lug terminal and bus bar of a main breaker with the cross section of the connector bar of the present invention illustrated in FIG. 7.

As illustrated in FIG. 9, the preferred cross-sectional embodiment of the connector bar 86 from FIG. 7 connects at one end 702 to a lug body 902 of one of the terminals 28 and 36 of the main breaker 24. The cross-section of the end 702 of the connector bar 86 has a flat top surface 904 for engaging the binding screw 906, arcuate sides 908 for abutting the interior contact surface 910 of the lug body, and a flat bottom 912 which does not initially contact the interior contact surface 910 the lug body. The arcuate sides 908 have approximately the same degree of arc as the interior contact surface 910 of the lug body. The flat bottom 912 has a width which is substantially less than the width of the top surface 904 which is preferably greater in width than the contact surface of the binding screw 906. Preferably, the top surface 904 measures about 0.7 inch in width, the bottom surface 912 measures about 0.4 inch, and the height of the arcuate sides 908 is about 0.23 inch.

Figure 10A:
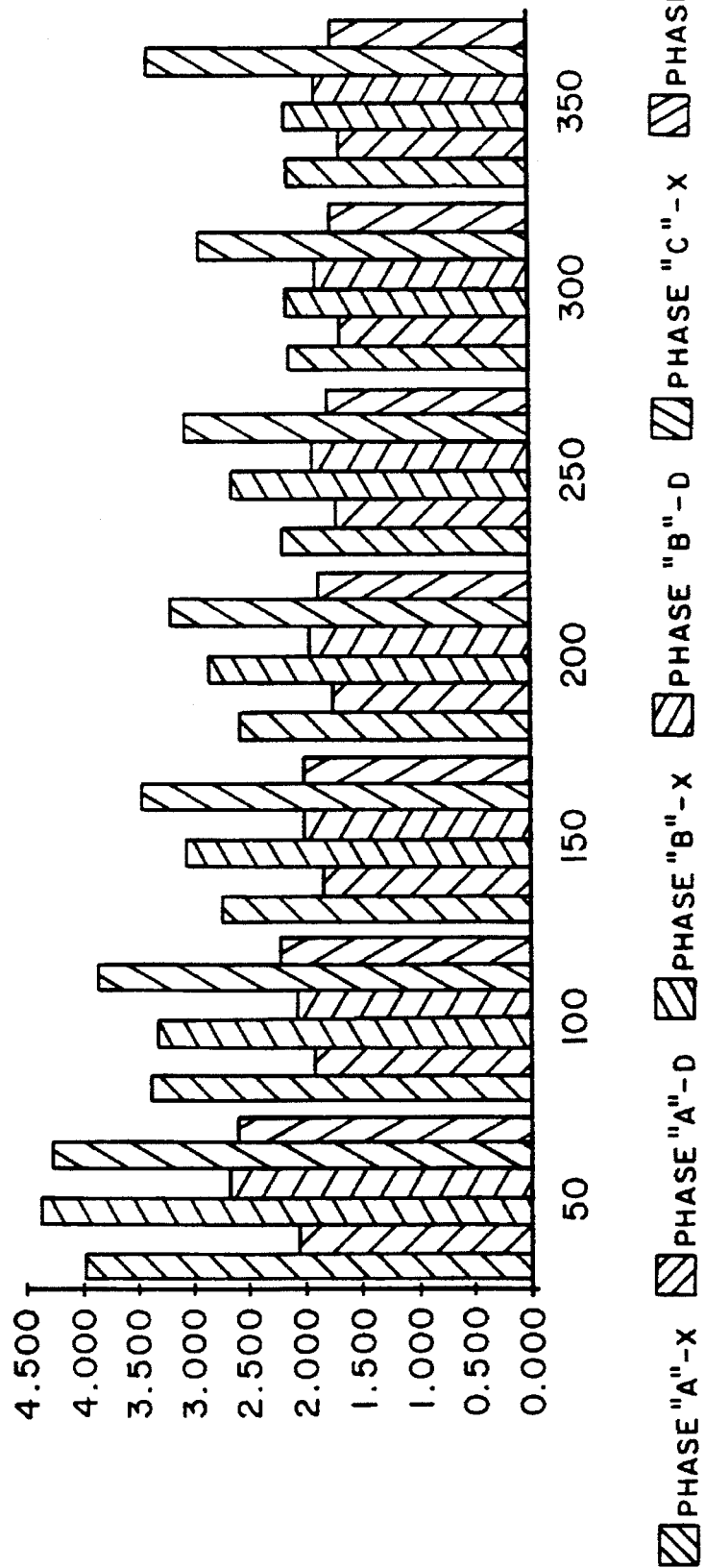
FIGS. 10A–C are charts representing the mv drop versus the torque applied to the lug body, at three locations illustrated in FIG. 9, across the width of the connection with the bus bar of the main breaker for the connector bar of the present invention versus the prior art.
Figure 10B:
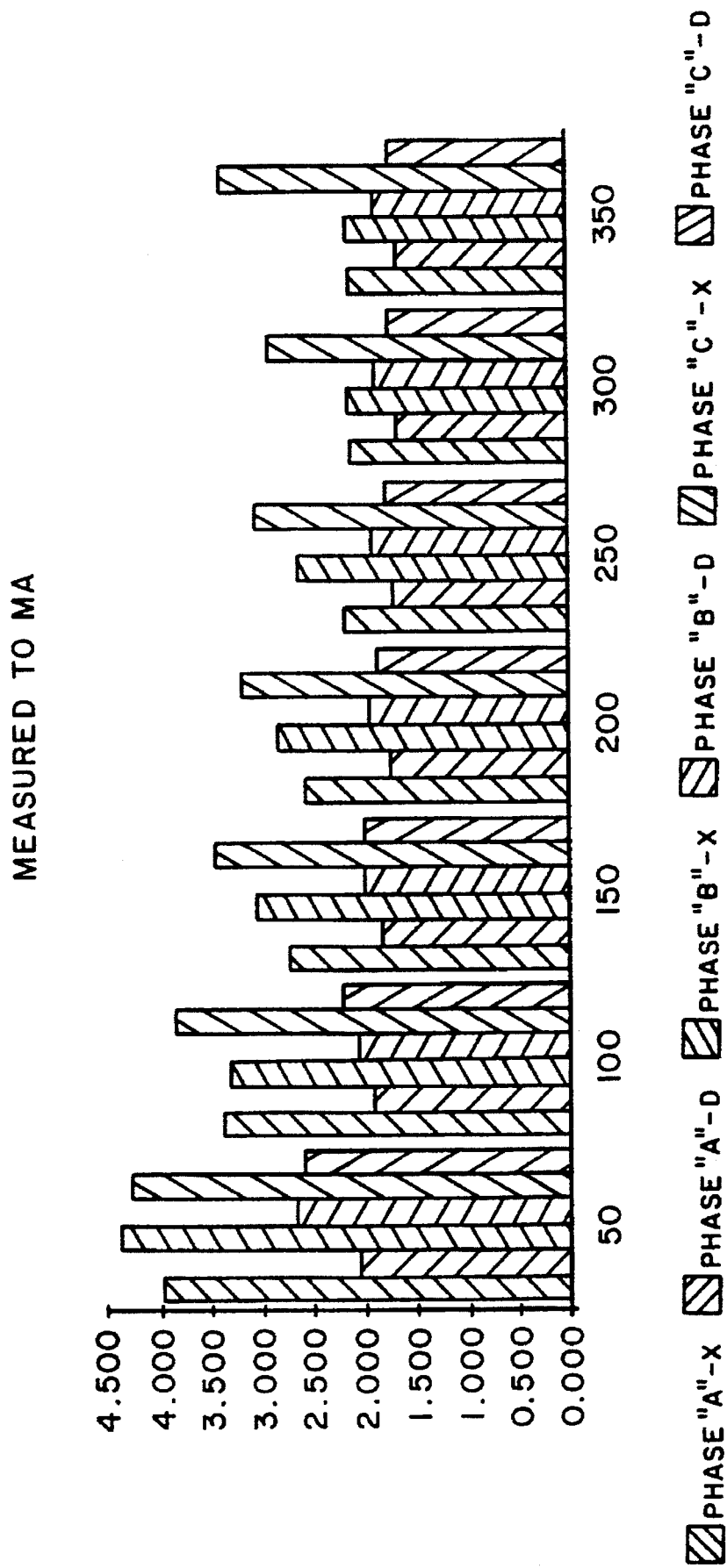
Figure 10C:
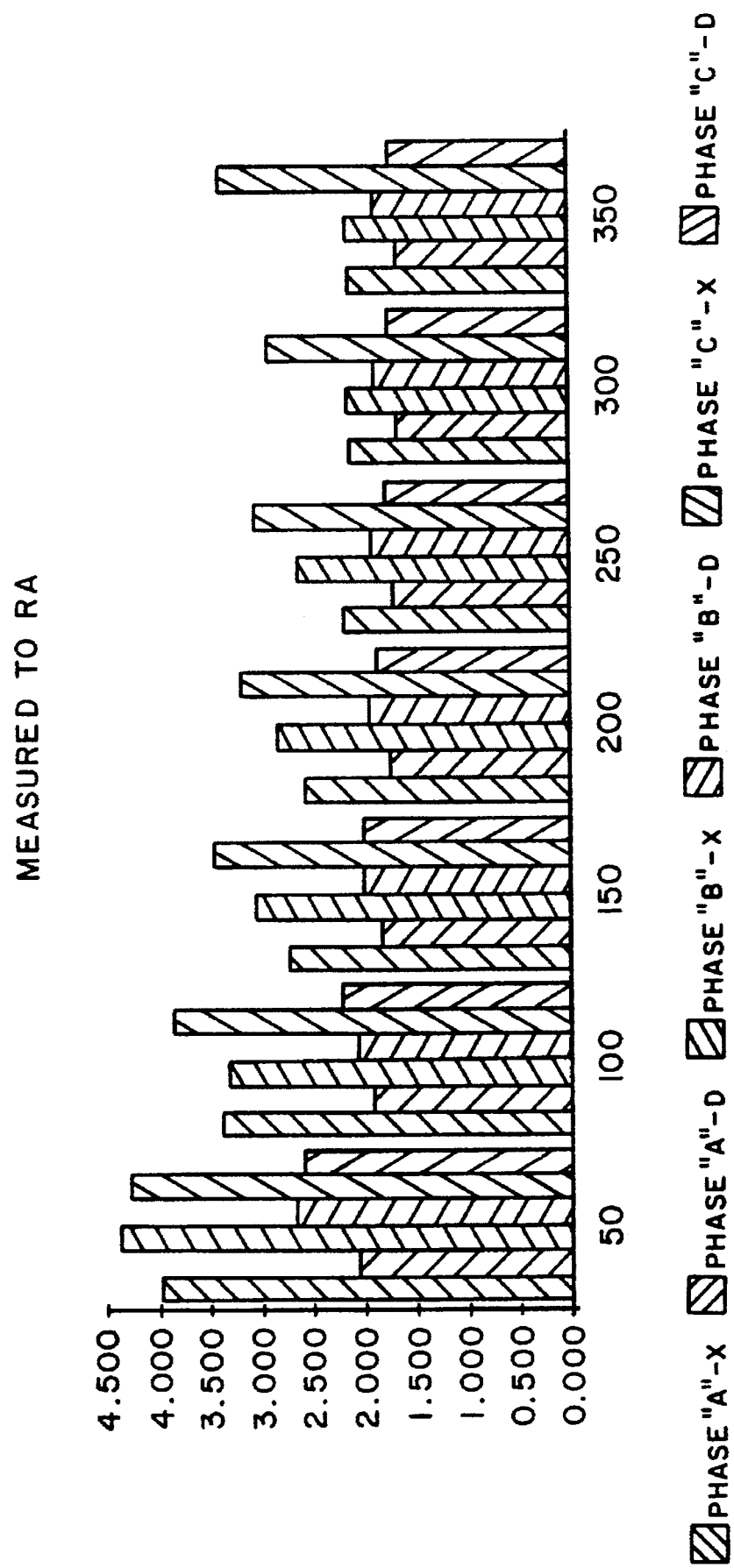

The connector bars 86 of the present invention improve the transfer of energy with the lowest heat rise between the connector bar 86 and the lug body 902 of one of the terminals of the main breaker. Measurements were taken at three different points LA, MA, and RA, located across the width of the connection between the breaker bus bar 914 and the lug body 902 of a terminal as illustrated in FIG. 9 for the three phases A, B, and C of a QDT 18 circuit breaker manufactured by the Square D Company. Approximately 200 amps were passed through the circuit breaker using a DC mv power supply. The voltage drop was measured across the QDT center bars and the QK lug at the three locations previously described with different torque applied to the binding screw 906 in a range of about 50 in. lbs. to about 350 in. lbs. in increments of about 50 in. lbs. The results of the measurements for all three locations and all three phases at each torque value is presented in the charts of FIGS. 10A–C. The y-axis is the mv drop across the connection and the x-axis is the torque in in. lbs. The measurements of the inventive connector bar having the cross-section illustrated in FIG. 9 are labeled as "D" and are compared to the measurements of the solid connector with the round cross-section illustrated in FIG. 7 labeled as "X" in the FIGS. 10A–C. As demonstrated by these measurements, the reduction of the mv drop across the electrical connection can be more than half by comparison to using a connector bar having a round cross-section.

Figure 11A:
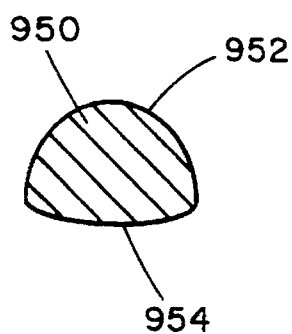
FIGS. 11A–C are a cross-sectional view of alternate embodiments of the inventive connector bar.
Figure 11B:
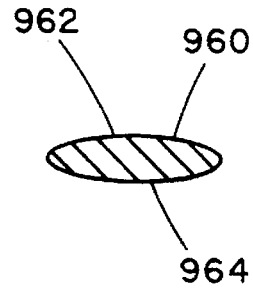
Figure 11C:
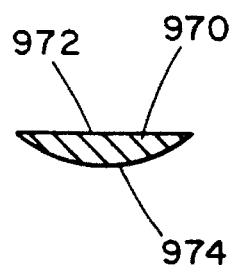

Other embodiments of the connector bars of the present invention are illustrated in FIGS. 11A–C. Other embodiments of the connector bar of the present invention with different cross-sections at the end of the connector bar are depicted. FIG. 11A illustrates the end of a connector bar 950 with a cross-section having a top half 952 and bottom half 954 of two arcuates with different arc values. FIG. 11B depicts another embodiment of a connector bar 960 with a cross-section having a top half 962 and bottom half 964 of two arcuates of about the same arc value. Preferably, the arc value approximates the interior contact surface of the lug body. FIG. 11C depicts another embodiment of the connector bar 970 having a cross-section with a flat top half 972 and an arcuate bottom half 974. The arc value of the bottom half approximates the interior surface of the lug body.

The inventive connector bar can be used with the prior art lug terminals on main breakers without decreasing the electrical contact between the connector bar and the bus bars of the main breaker and creating deleterious heat rise. Since the inventive connector bar can be inserted into the lug body of either "ON" or "OFF" terminals on a main breaker, no customizing of the terminals is necessary. The lug terminals of the main breaker can receive the service line from either the top or bottom of the load center without concern of the connector bar distorting the lug terminals on the opposite side of the main breaker.

Although the inventive connector bar has been described with regard to the lug terminals on a main breaker, the present invention is not so limited. The cross-section of the end of the connector bar can be used with the lug terminal on any electrical device or component of an interior assembly in a load center. The ability of the inventive connector bar to provide electrical connection to a lug terminal without distorting the lug body has wide application.

While particular embodiments and applications of the present applications of the present invention have been illustrated and described, it is to be understood that the invention is not limited to the precise construction disclosed herein and that various modifications, changes, and variations will be apparent to those skilled in the art may be made in the arrangement, operation, and details of construction of the invention disclosed herein without departing from the spirit and scope of the invention as defined in the appended claims.

What is claimed is:

1. A load center for distributing electrical service to branch circuits, the load center comprising:

an enclosure having a back wall, side walls and a removable cover defining an interior;

an interior panel assembly having at least one bus bar formed with branch stabs for electrically connecting to terminals extending from a plurality of circuit interrupters, the panel assembly having a generally planar support base with a front face for securing the bus bar, one end of the bus bar being adapted for electrical and mechanical connection to the electrical service, the panel assembly having means for aligning the interior panel assembly relative to the electrical service and relative to the enclosure for the load center so that the electrical service mounts to the back wall of the enclosure, the aligning means integrally formed with the support base and the back wall of the enclosure, the aligning means includes at least one pair of brackets fastened to the back wall of the enclosure, each bracket having an elongated body with a generally flat profile, the body is fastened to the back wall of the enclosure and at least one tab integrally formed with the body, the tab having side walls and a distal end extending perpendicularly outward from the body toward the interior of the enclosure, the tab having an embossed profile with the tab being raised out of the plane of the elongated body, the side wall of the tab facing one end of the enclosure forms a leading edge by gradually narrowing the width of the tab towards the distal end so that the leading edge assists the positioning of a flange integrally formed along the perimeter of the interior panel assembly, the flange sliding underneath the distal end by engaging the flange before the distal end to begin flexing the tab upward.

2. The load center defined in claim 1 wherein the aligning means includes an indentation formed in the perimeter of the support base, the indentation defined by an end wall and side walls, the spacing between the side walls pre-determined to nest an adjacent component therebetween so that lateral movement is restrained and the panel assembly is aligned within the desired position for mounting to the enclosure and for electrically connecting to another component of the panel assembly.

3. The load center defined in claim 2 wherein the aligning means further includes a second indentation nesting the indentation formed in the perimeter of the support base, the second indentation defined by a set of second end walls and a set of second side walls, the spacing between the second side walls pre-determined to nest a differently sized adjacent component therebetween so that lateral movement is restrained and the panel assembly is aligned within the desired position for mounting to the enclosure and for electrically connecting to another adjacent component of the panel assembly.

4. The load center of claim 2 wherein the load center includes an adjacent component which is a main breaker having terminals connecting to the electrical service and a second set of terminals connecting to the bus bar of the panel assembly, the main breaker having a housing with one end having a pre-determined size to compliment the indentation in the panel assembly.

5. The load center of claim 1 wherein the back wall of the enclosure includes nubs which protrude upwardly therefrom and the body of each bracket includes dimples corresponding to the nubs on the back wall so that the dimples and nubs provide alignment of the brackets for fastening to the back wall of the enclosure.

\* \* \* \* \*